United States Patent [19]

Schifferl

[11] Patent Number: 4,889,101

[45] Date of Patent: Dec. 26, 1989

[54] ARRANGEMENT FOR CALCULATING THE FUEL INJECTION QUANTITY FOR AN INTERNAL COMBUSTION ENGINE

[75] Inventor: Ludwig Schifferl, Regensburg, Fed. Rep. of Germany

[73] Assignee: Siemens Aktiengesellschaft, Berlin and Munich, Fed. Rep. of Germany

[21] Appl. No.: 244,344

[22] Filed: Sep. 16, 1988

[30] Foreign Application Priority Data

Nov. 6, 1987 [DE] Fed. Rep. of Germany ....... 3737812

[51] Int. Cl.⁴ ...................... F02D 41/06; F02D 41/18; F02D 41/32; G01F 1/68

[52] U.S. Cl. .................................... 123/494; 73/118.2

[58] Field of Search ........................ 123/478, 491, 494; 73/118.2, 204.14, 204.16, 204.25, 861.02, 861.03; 364/431.05, 510

[56] References Cited

U.S. PATENT DOCUMENTS

| | | | |
|---|---|---|---|
| 4,505,248 | 3/1985 | Yuzawa et al. | 123/519 |
| 4,612,894 | 9/1986 | Satoh et al. | 123/494 |
| 4,649,745 | 3/1987 | Kondo et al. | 73/204.14 X |
| 4,669,306 | 6/1987 | Akiyama et al. | 73/118.2 X |
| 4,683,858 | 8/1987 | Sato et al. | 123/494 X |
| 4,741,313 | 5/1988 | Shimomura | 123/494 |
| 4,760,829 | 8/1988 | Kanno et al. | 123/494 X |
| 4,817,573 | 4/1989 | Yamada et al. | 123/494 |
| 4,821,700 | 4/1989 | Weibler et al. | 123/494 |

FOREIGN PATENT DOCUMENTS

| | | |
|---|---|---|
| 0064664 | 11/1982 | European Pat. Off. . |
| A5823255 | 2/1983 | Japan . |

*Primary Examiner*—Willis R. Wolfe

*Attorney, Agent, or Firm*—Hill, Van Santen, Steadman & Simpson

[57] ABSTRACT

Arrangement for calculating the fuel injection quantity for an internal combustion engine. An air mass meter has a heated sensor and an air temperature sensor. Since, during a stop condition of an internal combustion engine, any and all cooling by a mass stream of air is absent, the air temperature sensor is heated by the heated sensor when the air mass meter continues to be turned on. In order to eliminate the error in an output signal of the air mass meter that occurs when the internal combustion engine is restarted, the air mass meter is shut off during the stop condition of the internal combustion engine.

3 Claims, 1 Drawing Sheet

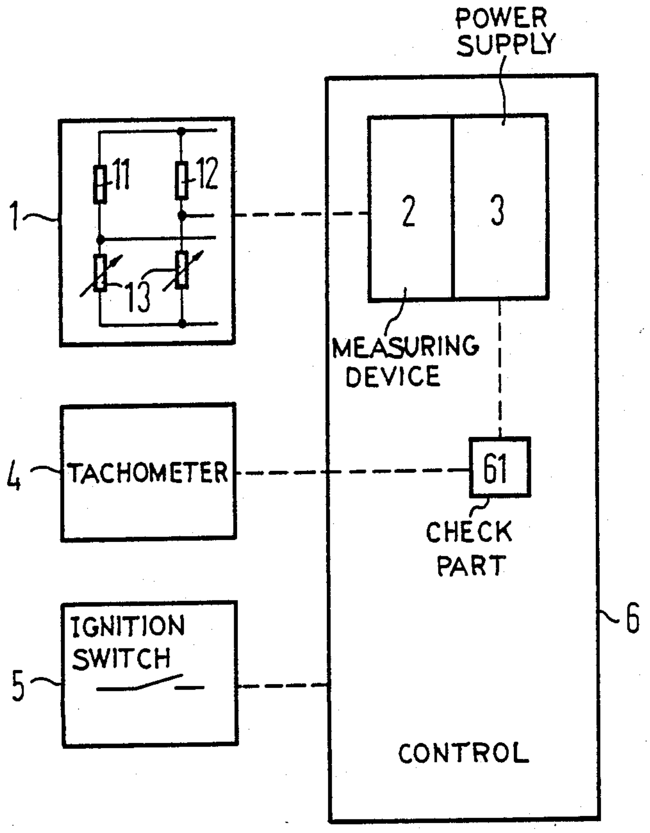
POWER SUPPLY
1
11
12
13
2
3
MEASURING DEVICE
4
TACHOMETER
61
CHECK PART
6
5
IGNITION SWITCH
CONTROL

ARRANGEMENT FOR CALCULATING THE FUEL INJECTION QUANTITY FOR AN INTERNAL COMBUSTION ENGINE

BACKGROUND OF THE INVENTION

The present invention is directed to an arrangement for calculating the fuel injection quantity for an internal combustion engine.

A control device calculates the fuel injection quantity for the internal combustion engine for output, signals for the mass stream of air taken in and for the speed of the internal combustion engine. However, an air mass meter having a heated sensor outputs an output signal which is a function of the mass stream of air taken in during steady state operation, i.e. when its heated sensor is heated to operating temperature. This, however, is not the case when starting the internal combustion engine. The measuring circuit does not distinguish between the current conduction for heating the heated sensor and current conduction caused by a mass stream of air. Accordingly, an output signal results that corresponds to too great an air mass value.

European Pat. No. 0 064 664 discloses a device in which the output signal of the air mass meter is supressed during the starting procedure of the internal combustion engine until the expiration of a timer and that a replacement signal be used instead. The error caused by the heating current thereby has no effect.

Tests, however, have shown that a further error in the output signal of the air mass meter occurs for a warm start of the internal combustion engine This error also leads to erroneously elevated air mass values and is slow to decay.

The present invention relates in particular to an arrangement having an air mass meter, that has a bridge circuit having a heated sensor and an air temperature sensor in an intake train of the internal combustion engine. The air mass meter further has a measuring circuit and a power supply for the bridge circuit, that outputs an output signal dependent on the mass stream air taken in. Also a tachometer outputs an output signal dependent on the rpm of the internal combustion engine. A control device using the output signals of the air mass meter and of the tachometer, calculates the fuel injection quantity to be supplied to the internal combustion engine. An ignition switch for switching the arrangement on and off is also provided.

SUMMARY OF THE INVENTION

It is therefore an object of the present invention to provide an arrangement for calculating the fuel injection quantity for an internal combustion engine such that the above described error is avoided.

The present invention has a control device containing a check part that disconnects the power supply of the air mass meter when the rpm of the engine falls below a threshold which is the starting rpm of the engine.

It has been shown that the error occurs during warm start when the ignition and, thus, the air mass meter as well were previously turned on during a stop condition of the internal combustion engine. Since no air mass is taken in during the stop condition of the internal combustion engine, a heating of the air temperature sensor occurs via heat conduction through the heated sensor due to an absence of cooling. The air temperature sensor serves the purpose of compensating for the temperature of the air taken in. When, however, its temperature lies above the temperature of the ambient air due to the effect set forth above, then the air mass meter supplies erroneously elevated measured values when the internal combustion engine is restarted. These measuring errors occur until the air temperature sensor has again cooled to the temperature of the ambient air as a result of the mass stream of air.

In order to eliminate this source of error, it is inventively proposed that the power supply of the air mass meter be disconnected when the speed of the internal combustion engine falls below a defined threshold. This threshold is lower than the lowest operating speed of the internal combustion engine that corresponds to the starting rpm. Falling below the threshold is thus equivalent to the stop condition of the internal combustion engine.

The heating of the air temperature sensor is avoided by shutting the power supply off. The re-activation of the air mass meter when the internal combustion engine is started again is guaranteed since the threshold of the speed triggering the shutoff lies below the starting rpm.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawing, and in which:

The single FIGURE shows an arrangement for calculating the fuel injection quantity for an internal combustion engine.

DESCRIPTION OF THE PREFERRED EMBODIMENT

An air mass meter is composed of a bridge circuit 1, of a measuring circuit 2 and of a power supply 3. A heated sensor 11 and an air temperature sensor 12 in the intake train of an internal combustion engine, as well as, further balancing resistors 13 form the bridge circuit 1. The detailed structure and the functioning of such an air mass meter are known and, for example, are disclosed by German Patent Application 35 14 118. The electrical connections between the bridge circuit 1 and the measuring circuit 2 or power supply 3 are therefore only indicated by a dot-dash interactive connection in the FIGURE. The active electronic component parts of the measuring circuits 2 and of the power supply 3 are integrated in a control device 6 spatially separated from the bridge circuit 1. This has the advantage that only the passive component parts of the bridge circuit 1 are located in the intake train of the internal combustion engine that is exposed to high temperatures. The useful life of the active electronic component parts is therefore considerably enhanced. The control device 6 is essentially a microprocessor that calculates the fuel injection quantity for the internal combustion engine from output signals of the air mass meter and of a tachometer 4. The tachometer 4 is thereby an arbitrary tachometer that can output an output signal suitable for processing in a microprocessor An ignition switch 5 serves the purpose of turn-on and turnoff of the control device 6 and, thus, of the entire arrangement. This ignition switch 5 is identical to the switch usually used in motor vehicles for activating the electrical systems of the vehicle When the internal combustion engine is turned off by the ignition switch 5, then the power supply 3 of the air mass meter is also shut off and no over heating of the air temperature sensor 12 can occur. When, by contrast, the internal combustion engine has come to a stop and the ignition switch 5 remains turned on, the heated sensor 11 of the air mass meter continues to be set to a constant elevated temperature in comparison to the temperature of the air temperature sensor 12. Since any and all cooling by a mass stream of air is absent during the stop condition of the internal combustion engine, the air temperature sensor 12 is heated via the mechanical mounts as a result of heat conduction and is also heated via direct heat radiation from the heated sensor 11. When the internal combustion engine is restarted, the air mass meter therefore outputs an erroneous output signal.

This condition of the ignition switch 5 being turned on during the stop condition of the internal combustion engine can last for a long time under certain conditions. This, for example, is the case when using electrical equipment during the stop condition of the internal combustion engine, this electrical equipment being switched on by the ignition switch 5. The measuring error of the air mass when the internal combustion engine is restarted is all the greater the longer the duration of this condition.

In order to prevent this, a check part 61 is provided in the control device 6, this check part 61 being supplied with the output signal of the tachometer 4 and being capable of switching the power supply 3 of the air mass meter on and off. The check part 61 is a threshold unit that disconnects the power supply when the rpm of the engine falls below the starting rpm of the internal combustion engine and which does not re-engage the power supply until this threshold is reached again. When the internal combustion engine stands still, the power supply 3 of the air mass meter is disconnected and the air temperature sensor 12 is not over heated, even though the ignition switch 5 remains turned on. Since the threshold of the rpm is already exceeded during the starting procedure of the internal combustion engine, the power supply 3 is immediately re-engaged upon re-start.

The invention is not limited to the particular details of the apparatus depicted and other modifications and applications are contemplated. Certain other changes may be made in the above described apparatus without departing from the true spirit and scope of the invention herein involved It is intended, therefore, that the subject matter in the above depiction shall be interpreted as illustrative and not a limiting sense.

What is claimed is:

1. An arrangement for calculating the fuel injection quantity for an internal combustion engine;

having an air mass meter, that has a bridge circuit having an heated sensor and an air temperature sensor in an intake train of the internal combustion engine, and that has a measuring circuit and a power supply for the bridge circuit, and that outputs an output signal dependent on the mass stream of air taken in, having a tachometer that outputs an output signal dependent on the rpm of the internal combustion engine;

having a control device that, upon receiving the output signals of the air mass meter and of the tachometer, calculates the fuel injection quantity to be supplied to the internal combustion engine; and having an ignition switch for switching the arrangement on and off, comprising said control device containing a check part that disconnects the power supply of the air mass meter when the rpm of the internal combustion engine falls below a threshold which is substantially a starting rpm of the internal combustion engine.

2. An arrangement for calculating the fuel injection quantity for an internal combustion engine having an air mass meter which provides an output signal indicative of the mass stream of air taken in by the engine, the air mass meter having at least a power supply connected thereto, the arrangement also having a tachometer which provides an output signal indicative of the rpm of the engine, a control device for receiving the output signals of the air mass meter and the tachometer and for calculating the fuel injection quantity to be supplied to the engine, and an ignition switch for turning the arrangement on and off, comprising:

a check part contained in said control device and connected to said power supply, said check part receiving the output signal of said tachometer, and said check part having a threshold which is substantially equal to a starting rpm of the engine, said check part disconnecting said power supply from said air mass meter when the rpm of the engine falls below said threshold.

3. An arrangement according to claim 2 wherein said check part also connects said power supply to said air mass meter when the rpm of the engine rises above the threshold.

* * * * *